United States Patent [19]

Stahl

[11] 4,105,413

[45] Aug. 8, 1978

[54] CATALYTIC CONVERTER APPARATUS, ESPECIALLY FOR OXIDES OF NITROGEN

[75] Inventor: Quade R. Stahl, Springfield, Va.

[73] Assignee: Meloy Laboratories, Inc., Springfield, Va.

[21] Appl. No.: 712,216

[22] Filed: Aug. 6, 1976

Related U.S. Application Data

[62] Division of Ser. No. 562,819, Mar. 28, 1975, Pat. No. 3,979,501.

[51] Int. Cl.² .................................................. B01J 8/06
[52] U.S. Cl. ............................... 23/288 R; 23/288 J;
23/289; 23/232 R; 423/405
[58] Field of Search ............... 23/288 R, 288 J, 289; 423/405

[56] References Cited

U.S. PATENT DOCUMENTS

| | | | |
|---|---|---|---|
| 1,803,306 | 4/1931 | Stengel | 23/289 |
| 3,865,555 | 2/1975 | Elebracht et al. | 23/288 M X |

Primary Examiner—James H. Tayman, Jr.
Attorney, Agent, or Firm—Shapiro and Shapiro

[57] ABSTRACT

A catalytic converter comprises a block having a bore receiving a tube coaxially, the tube being suspended in the bore by a fitting threaded into one end of the bore and being spaced from the wall of the bore so that a gas may flow along the exterior of the tube and then through the interior of the tube. For converting nitrogen dioxide to nitric oxide, the tube contains copper granules held in place by plugs of copper turnings. Temperature control and regulation are also provided.

5 Claims, 4 Drawing Figures

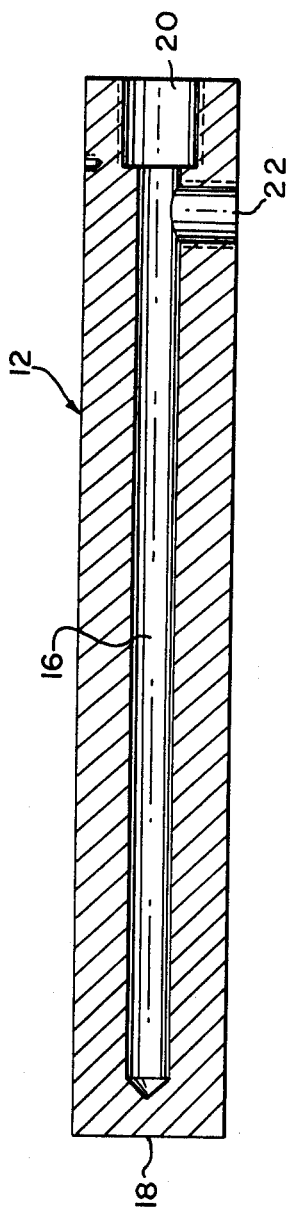
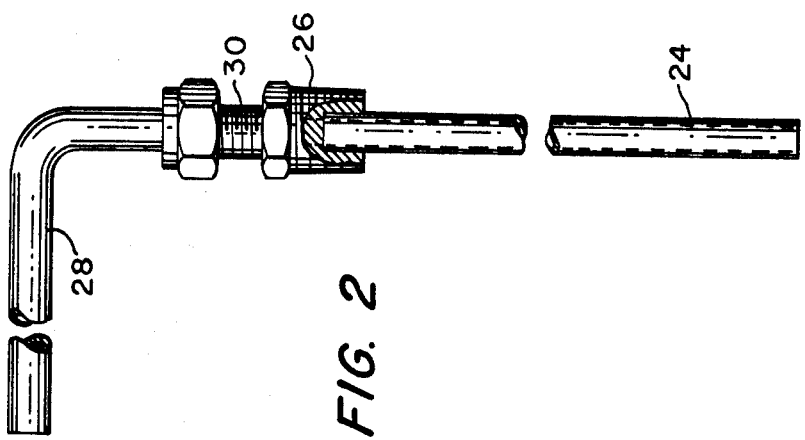

CATALYTIC CONVERTER APPARATUS, ESPECIALLY FOR OXIDES OF NITROGEN

This is a divisional application of Ser. No. 562,819, filed Mar. 28, 1975, now U.S. Pat. No. 3,979,501, issued Sep. 7, 1976.

BACKGROUND OF THE INVENTION

This invention is concerned with catalytic apparatus, particularly for the conversion of nitrogen dioxide to nitric oxide.

Instruments which measure the concentration of oxides of nitrogen by chemiluminescent techniques are well known. In general, such instruments detect the light produced by the reaction of ozone and nitric oxide which are mixed in the detector head, the light resulting from the reaction being sensed by a photomultiplier tube. Since the chemiluminescent reaction requires nitric oxide to work, if a concentration of nitrogen dioxide is to be measured, it must first be converted to nitric oxide. Hence, various types of converters have heretofore been proposed for use in instruments for determining oxides of nitrogen in ambient air or emission sources and also for use with calibration units having a nitrogen dioxide source.

Converters employing various types of catalytic materials are well known. However, the converters employed heretofore have suffered from one or more of the following disadvantages or deficiencies: high cost, restricted range in terms of the concentrations of $NO_2$ which can be converted, short lifetime, high operating temperatures, production of interfering compounds, inefficiency, complexity, and inability to operate in the presence of other gases or under certain ambient conditions.

BRIEF DESCRIPTION OF THE INVENTION

It is accordingly a principal object of the present invention to provide an improved catalytic apparatus, particularly for converting nitrogen dioxide to nitric oxide.

Briefly stated, in accordance with a preferred embodiment of the invention a metal block has an elongated bore open at one end and closed at the opposite end. A tube is supported by a fitting threaded into said one end of the bore and has its outer surface spaced from the inner surface of the bore to provide a thin space therebetween. The interior of the tube contains a catalyst and communicates with said space adjacent to said opposite end of the bore. Gas to be treated is admitted to said space adjacent to the fitting, so that gas may flow along the space and then through the tube. The gas is exhausted from the tube through the fitting. Heatng means for the block heats the gas flowing in said space to a desired temperature. More specifically, for converting nitrogen dioxide to nitric oxide, the tube is preferably formed of copper and contains copper granules held in place by plugs of copper turnings.

BRIEF DESCRIPTION OF THE DRAWINGS

The invention will be further described in conjunction with the accompanying drawings, which illustrate a preferred and exemplary embodiment, and wherein:

FIG. 2 is a contracted elevation view, partly in section, illustrating the copper tube and associated fittings and exhaust conduit;

FIG. 3 is a longitudinal sectional view of the body; and

FIG. 4 is a block diagram illustrating the utilization of the converter of the invention in a chemiluminescent detection system.

DETAILED DESCRIPTION OF THE INVENTION

Figure 1:
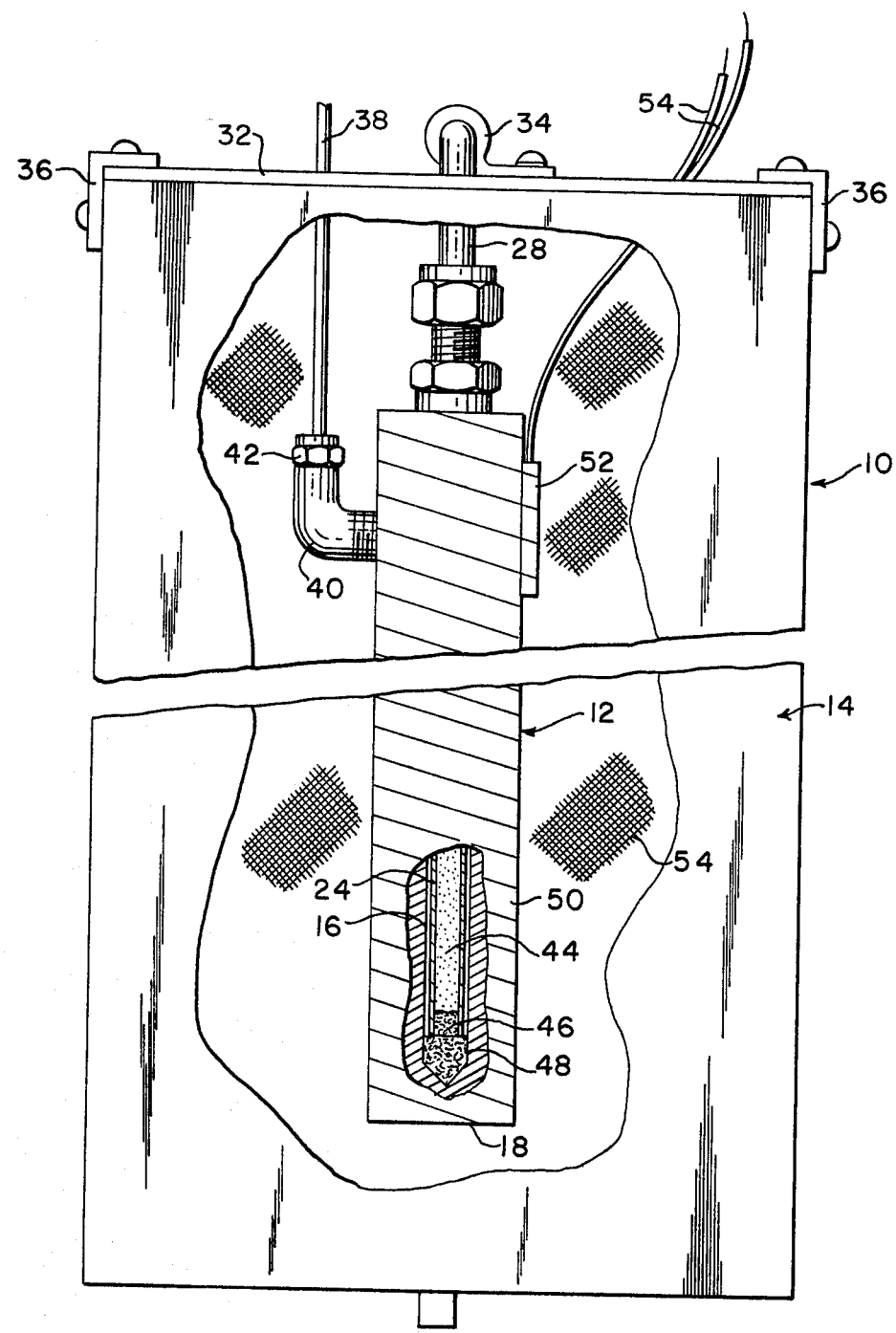
FIG. 1 is a contracted elevation view of the invention with the housing and body partially broken away to reveal internal parts.

As shown in FIG. 1, the converter apparatus 10 of the invention may comprise a body 12 supported within a housing 14. As shown in FIG. 3, the body 12 may comprise a cylindrical block of stainless steel provided with an elongated central bore 16. One end of the bore terminates short of the corresponding end 18 of the block and the other end communicates with an enlarged internally threaded bore 20 constituting an extension of the bore 16. A threaded side bore 22 communicates with bore 16 adjacent to bore 20.

Received within bore 16 is a tube 24, preferably of copper. Tube 24 is preferably silver soldered within a bore of a threaded fitting 26, which is threaded into the bore 20 of the body or block 12. An exhaust conduit 28 communicates with tube 24 via a further fitting 30 threaded into fitting 26. Fittings 26 and 30 may be of the Swagelok type. As shown in FIG. 1, the body 12 may be suspended from the cover 32 of the housing 14 (also cylindrical) the exhaust conduit 28 extending through a hole in the cover, then being bent at right angles along the cover and being secured thereto by a clamp 34. In the form shown, the cover disc 32 is retained upon the cylindrical side wall of the housing by means of fasteners 36, the opposite end of the housing being permanently closed. A pipe 38 for the supply of gas to be treated is coupled to the body via elbow 40 threaded into bore 22 of the body and provided with a fitting 42, which may be of the Swagelok type, for gas tight connection to pipe 38, which passes through a hole in cover 32.

As shown in FIG. 1, the external diameter of tube 24 is less than the internal diameter of bore 16, so that the tube is spaced from the wall of the bore. Also, the end of tube 24 adjacent to the end 18 of the body terminates short of the corresponding end of the bore to provide communication between the bore and the interior of the tube 24. It is thus apparent that gas supplied by pipe 38 may enter the space between the bore wall and the exterior wall of tube 24, travel along the exterior of tube 24 in one direction and then enter the interior of the tube and travel along the tube in the opposite direction, being exhausted from the tube via conduit 28. Fitting 26 prevents movement of the gas through bore 20 of the block until the gas has followed the path just described.

The interior of tube 24 is filled with copper granules 44 held in the tube by plugs 46 of copper turnings or shavings, such as the type produced by the machining of copper stock. The copper granules may be light copper chips sold by Fisher Scientific Company. The portion of bore 16 adjacent to end 18 of the block may also be filled with copper turnings as indicated at 48, to aid in retention of the particulate bed in tube 24. Plug 46 at the top of tube 24 is not shown.

To supply heat to the block an electric heater 50 is wrapped about the exterior of the block. Preferably a preliminary wrapping of glass tape is provided, then the heater, in the form of a heating tape, then an asbestos insulating tape, and finally an aluminum tape, all wrapped in sequence about the block. Prior to the foregoing wrapping, a strain relief may be provided at 52, secured to the block by means of a screw. Heater lead wires 54 are then connected to the heater via "wireform" contacts held by the strain relief. A thermistor (not shown) taped to the body 12, and connected to lead wires via the strain relief also, is employed in a conventional temperature control circuit for controlling the electric energy supplied to the heater 50, thereby to control and maintain the temperature of the block. A thermocouple (not shown) may be similarly mounted and connected for temperature measurement. The interior of housing 14 is filled with insulation 54, such as glass wool, to isolate the block from ambient temperature.

In operation, gas to be treated, containing nitrogen dioxide, is supplied to the block by pipe 38, the gas passing through the bore 16 along the exterior of pipe 24 and then passing through pipe 24 and out the exhaust pipe 28, the gas being heated to a temperature within the range of about 220° C. to 240° C., the temperature at which the heater 50 maintains the block. In passing over the catalytic material within the block, namely the copper tube 24, the copper chips or granules 44, and the copper turnings 46 and 48, nitrogen dioxide is efficiently converted to nitric oxide. The inexpensive copper catalyst has been found to operate efficiently in the relatively low operating temperature range specified over long periods of time without maintenance or renewal. Moreover, when the gas supplied is dry air of very low humidity (containing nitrogen dioxide, of course) the use of copper granules or chips (of about 20 mesh) appears to avoid the problem of erratic operation previously experienced with other types of catalysts.

FIG. 4 illustrates the utilization of the converter 10 in a chemiluminescent instrument for measuring the concentration of oxides of nitrogen in ambient air, for example. The sample passes through the converter 10, nitrogen dioxide being converted to nitric oxide thereby, and is supplied to a chemiluminescent detector head 56, to which ozone is also supplied at 58. The resultant reaction of ozone and nitric oxide produces light detected by a photomultiplier tube incorporated within the detector 56. The gas stream is drawn through converter 10 and detector 56 by vacuum pump 60 coupled to the detector via a vacuum regulator 62 and a filter 64. Filter 64, preferably a charcoal-containing cannister, is necessary to prevent corrosion of the pump which would otherwise be caused by the ozone.

In an actual embodiment of the converter, block 12 is 7 inches long and 1 inch in diameter. Bore 16 is 6.75 inches long (including bore 20) and 0.281 inches in diameter. Tube 24 is 6.25 inches long with a 0.250 inch outer diameter and a 0.030 inch wall thickness. Tube 28 is a 0.250 inch outer diameter tube with a 0.028 inch wall thickness, while tube 38 is a 0.062 inch outer diameter tube with a 0.010 inch wall thickness. The sample gas flow rate is between 400 and 500 cc per minute, and the concentration of the $NO_2$ converted is between 0 and 10 parts per million.

While a preferred form of the invention has been shown and described, it will be appreciated that changes can be made without departing from the principles and spirit of the invention, the scope of which is defined in the following claims. Although copper chips or granules of the type mentioned are the highly preferred catalyst, such chips and granules oxidize, even at room temperature, and the term copper-containing catalyst employed in the claims is intended to encompass such oxides and similar compounds of copper. Higher order oxides of nitrogen may also be converted by the invention (all such oxides being referred to as "nitrogen dioxide or the like"). Within the broader aspects of the invention the gas flow passage may be defined other than by a copper tube within and spaced from the wall of a block bore, although that arrangement is preferred and provides preheating of the gas along the interior of the bore. In the preferred form of the invention shown and described (with a flow rate of about 400 to 500 cc per minute and with the copper chips filling but not tightly pressed into the copper tube) the stated temperature range is appropriate. Below about 220° C. the desired conversion becomes less efficient, while above about 240° C. conversion of other nitrogen compounds, such as ammonia, may produce interference. However, within the broader aspects of the invention, other flow rates and particulate packing densities of the catalyst bed may dictate somewhat different temperatures.

The invention claimed is:

1. Catalytic apparatus of the type described comprising a metal block having an elongated bore open at one end and closed at the opposite end, a tube within said bore and having an outer surface defining with the inner surface of the bore a thin space therebetween, the interior of said tube containing a catalyst and communicating with said space adjacent to said opposite end of the bore, the open end of said bore being provided with a bore extension having internal threads, said tube having one end connected to and supported by an externally threaded fitting that is threaded into said internal threads and that has a passage therethrough communicating with the interior of the tube at said one end, said tube extending from said fitting and being dimensioned so that the tube can be inserted into said bore through the open end of the bore when the fitting is threaded into the bore extension, means for admitting gas to be treated to said space adjacent to said fitting, said fitting closing said bore extension so that said gas is constrained to flow along said space and then through said tube, means for exhausting said gas from said tube through said fitting passage, and means for heating said block to heat said gas flowing in said space to a desired temperature.

2. Catalytic apparatus in accordance with claim 1, wherein said tube has a side wall of thickness much less than the thickness of the walls of said bore.

3. Catalytic apparatus in accordance with claim 2, further comprising means for maintaining said block at said temperature.

4. Catalytic apparatus in accordance with claim 1, wherein said catalyst comprises copper granules retained in said tube by plugs of copper turnings at opposite ends of said tube.

5. Catalytic apparatus in accordance with claim 4, wherein said tube is suspended from said fitting with an open end spaced from said opposite end of said bore.

* * * * *